(12) United States Patent
Xie et al.

(10) Patent No.: US 9,094,902 B2
(45) Date of Patent: Jul. 28, 2015

(54) METHOD AND APPARATUS FOR DETERMINING COMMUNICATION PARAMETER AND FOR COMMUNICATION IN WLAN

(71) Applicant: CHINA MOBILE COMMUNICATIONS CORPORATION, Beijing (CN)

(72) Inventors: Fang Xie, Beijing (CN); Youjun Gao, Beijing (CN); Ba Jin, Beijing (CN); Zhenping Hu, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 0 days.

(21) Appl. No.: 13/261,877

(22) PCT Filed: Nov. 13, 2012

(86) PCT No.: PCT/CN2012/084497
§ 371 (c)(1),
(2) Date: May 14, 2014

(87) PCT Pub. No.: WO2013/071849
PCT Pub. Date: May 23, 2013

(65) Prior Publication Data
US 2014/0293800 A1    Oct. 2, 2014

(30) Foreign Application Priority Data
Nov. 14, 2011 (CN) .......................... 2011 1 0360160

(51) Int. Cl.
*H04W 40/24* (2009.01)
*H04W 36/00* (2009.01)
*H04W 84/12* (2009.01)

(52) U.S. Cl.
CPC .......... *H04W 40/246* (2013.01); *H04W 36/005* (2013.01); *H04W 36/0022* (2013.01); *H04W 36/0077* (2013.01); *H04W 36/0088* (2013.01); *H04W 84/12* (2013.01)

(58) Field of Classification Search
None
See application file for complete search history.

(56) References Cited

U.S. PATENT DOCUMENTS 5,781,862 A * 7/1998 Da Silva et al. ............. 455/436
6,021,333 A * 2/2000 Anderson et al. ............ 455/560
(Continued)

FOREIGN PATENT DOCUMENTS

| CN | 1643852 | 7/2005 |
|----|---------|--------|
| CN | 101296517 | 10/2008 |
| CN | 101461272 | 6/2009 |

OTHER PUBLICATIONS

J. Liang, X. He, H. Tang, Proposal for Fast Inter-BBS Transitions, Submission to IEEE 802.11 Working Group, Doc No. IEEE 802.11-05/0037r0, Jan. 2005, pp. 1-14.*

(Continued)

*Primary Examiner* — Christopher Crutchfield
(74) *Attorney, Agent, or Firm* — Workman Nydegger

(57) ABSTRACT

A communication parameter determination method, and a WLAN communication method and device, comprising: a base station determines a first communication parameter used by a first mobile terminal for communication in a WLAN, the first communication parameter representing a first waiting time of the first mobile terminal in the WLAN from the time of determining that the channel is idle to the time of starting to communicate, and the first waiting time being less than a second waiting time of a second mobile terminal in the WLAN from the time of determining that the channel is idle to the time of starting to communicate; the base station transmits the determined first communication parameter to the first mobile terminal. Accordingly, the first mobile terminal about to switch from a cellular network to the WLAN receives the first communication parameter transmitted by the base station; and after accessing the WLAN, the first mobile terminal uses the first communication parameter to communicate in the WLAN. The solution provided in an embodiment of the present invention improves the WLAN communication quality for a mobile terminal that has switched from a cellular network to a WLAN.

18 Claims, 9 Drawing Sheets

(56) References Cited

U.S. PATENT DOCUMENTS

| | | | |
|---|---|---|---|
| 6,377,540 B1* | 4/2002 | Hogberg et al. | 370/216 |
| 6,477,373 B1* | 11/2002 | Rappaport et al. | 455/436 |
| 6,580,899 B1* | 6/2003 | Dalgleish et al. | 455/69 |
| 7,187,667 B1* | 3/2007 | Minowa et al. | 370/335 |
| 2002/0154653 A1* | 10/2002 | Benveniste | 370/447 |
| 2005/0265282 A1* | 12/2005 | Gross et al. | 370/329 |
| 2006/0209686 A1* | 9/2006 | Wigard et al. | 370/229 |
| 2012/0170556 A1* | 7/2012 | Tsfati et al. | 370/338 |

OTHER PUBLICATIONS

Author Unknown, IEEE 802.11e-2005, pp. 1-189, 2005.*

H. Park, S. Yoon, T. Kim, J. Park, M. Do, J. Lee, Vertical Handoff Procedure and Algorithm between IEEE 802.11 WLAN and CDMA Cellular Network, Lecture Notes in Computer Science (LNCS), No. 2524, pp. 103-112, 2003.*

PCT/CN2012/084497, Feb. 28, 2013, International Search Report.

* cited by examiner

METHOD AND APPARATUS FOR DETERMINING COMMUNICATION PARAMETER AND FOR COMMUNICATION IN WLAN

The present application is a US National Stage of International Application No. PCT/CN2012/084497, filed 13 Nov. 2012, designating the United States, and claiming priority to Chinese Patent Application No. 201110360160.3, filed with the Chinese Patent Office on Nov. 14, 2011 and entitled "Method and apparatus for determining communication parameter and for communication in WLAN", which is hereby incorporated by reference in its entirety.

FIELD OF THE INVENTION

The present invention relates to the field of Wireless Local Area Network (WLAN) technologies in the field of wireless communication technologies and particularly to a method and apparatus for determining a communication parameter and for communication in a WLAN.

BACKGROUND OF THE INVENTION

At present, WLAN operates in a license-exempt frequency band of 2.4G and has been considered as important means of offloading cellular network services due to its low device cost, easiness to deploy, high data rate and other advantages. A burden on a cellular network can be effectively lowered by using the WLAN to offload webpage browsing, QQ, MSN and other low-value services among the cellular network services or by using the WLAN to offload the cellular network services when congestion occurs in the cellular network, and the WLAN can improve indoor coverage and provide an access at a high speed, to provide subscribers with better wireless network services.

However, after a mobile terminal originally served in the cellular network is handed over to the WLAN, an Access Point (AP) in the WLAN accessed by the mobile terminal may currently be heavily loaded, thus resulting in a poor network quality condition and even a congestion status of the network, and then the mobile terminal communicating in the WLAN through the AP cannot be provided with a high quality of service, so that the mobile terminal may have to be handed over back to the cellular network, thus bringing a higher burden to the cellular network and influencing an experience of the subscriber.

SUMMARY OF THE INVENTION

In view of this, embodiments of the invention provide a method and apparatus for determining a communication parameter and for communication in a WLAN, so as to address the problem in the prior art of a low quality of service while a mobile terminal handed over from a cellular network to the WLAN communicates in the WLAN.

The embodiments of the invention are implemented in the following technical solutions:

An embodiment of the invention provides a method for determining a communication parameter used by a mobile terminal, including:

a base station determining a first communication parameter used by a first mobile terminal in communication in a WLAN, wherein the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and sending the determined first communication parameter to the first mobile terminal.

An embodiment of the invention further provides a method for communication by a mobile terminal in a WLAN, including:

a first mobile terminal to be handed over from a cellular network to the WLAN receiving a first communication parameter sent by a base station, wherein the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and communicating in the WLAN using the first communication parameter after accessing the WLAN.

An embodiment of the invention further provides a base station including:

a parameter determination component configured to determine a first communication parameter used by a first mobile terminal in communication in a WLAN, wherein the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a sending component configured to send the determined first communication parameter to the first mobile terminal.

An embodiment of the invention further provides a mobile terminal including:

a reception component configured to receive a first communication parameter sent by a base station, wherein the first communication parameter indicates a first wait length of time of the mobile terminal in a WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from a cellular network to the WLAN; and a communication component configured to communicate in the WLAN using the first communication parameter after the mobile terminal is handed over from the cellular network to the WLAN.

An embodiment of the invention further provides a method for accessing by a mobile terminal a WLAN, including:

a first mobile terminal to be handed over from a cellular network to a WLAN generating an identity notification message used to notify an AP that the first mobile terminal is a mobile terminal to be handed over from the cellular network to the WLAN; and sending the identity notification message to the AP in the course of accessing the WLAN through information interaction with the AP.

An embodiment of the invention further provides a method for determining a communication parameter used by a mobile terminal, including:

an AP receiving an identity notification message sent by a first mobile terminal;

determining based upon the received identity notification message that the first mobile terminal is a mobile terminal to be handed over from a cellular network to a WLAN;

determining a first communication parameter used by the first mobile terminal in communication in the WLAN through the AP, wherein the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and sending the determined first communication parameter to the first mobile terminal.

An embodiment of the invention further provides a method for determining a communication parameter used by a mobile terminal, including:

an AP receiving an identity notification message sent by a first mobile terminal;

determining based upon the received identity notification message that the first mobile terminal is a mobile terminal to be handed over from a cellular network to a WLAN;

determining an updated NAV value based upon a currently valid largest one of NAV values configured by other mobile terminals in the WLAN, wherein the updated NAV value is the sum of a remaining length of time and an predicted length of time, and the remaining length of time is a remaining length of time, of a length of time indicated by the largest NAV value, from the current moment, and the predicted length of time is a length of time predicted to be required for the current communication by the first mobile terminal; and sending an indication message carrying the updated NAV value to the other mobile terminals.

An embodiment of the invention further provides a mobile terminal including:

a message generation component configured to generate an identity notification message used to notify an AP that the mobile terminal is a mobile terminal to be handed over from a cellular network to a WLAN; and a sending component configured to send the identity notification message to the AP in the course of accessing the WLAN through information interaction with the AP.

An embodiment of the invention further provides an AP, including:

a reception component configured to receive an identity notification message sent by a first mobile terminal;

a terminal determination component configured to determine based upon the received identity notification message that the first mobile terminal is a mobile terminal to be handed over from a cellular network to a WLAN;

a parameter determination component configured to determine a first communication parameter used by the first mobile terminal in communication in the WLAN through the AP, wherein the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a sending component configured to send the determined first communication parameter to the first mobile terminal.

An embodiment of the invention further provides an AP, including:

a reception component configured to receive an identity notification message sent by a first mobile terminal;

a terminal determination component configured to determine based upon the received identity notification message that the first mobile terminal is a mobile terminal to be handed over from a cellular network to a WLAN;

an NAV determination component configured to determine an updated NAV value based upon a currently valid largest one of NAV values configured by other mobile terminals in the WLAN, wherein the updated NAV value is the sum of a remaining length of time and an predicted length of time, and the remaining length of time is a remaining length of time, of a length of time indicated by the largest NAV value, from the current moment, and the predicted length of time is a length of time predicted to be required for the current communication by the first mobile terminal; and a sending component configured to send an indication message carrying the updated NAV value to the other mobile terminals.

Advantageous effects of the invention are as follows.

In a method according to an embodiment of the invention, for a first mobile terminal to be handed over from a cellular network to a WLAN, a base station determines a first communication parameter used by the first mobile terminal in communication in the WLAN and sends the determined first communication parameter to the first mobile terminal. Correspondingly, the first mobile terminal receives the first communication parameter sent by the base station and then communicates in the WLAN using the first communication parameter after accessing the WLAN. Since a first wait length of time, used by the first mobile terminal in the WLAN, indicated by the first communication parameter is shorter than a second wait length of time used by the second mobile terminal in the WLAN, which is not handed over from the cellular network to the WLAN, the first mobile terminal can occupy an idle channel for communication at a priority higher than the second mobile terminal, to improve a quality of service while the mobile terminal handed over from the cellular network to the WLAN communicates in the WLAN.

In a method according to an embodiment of the invention, a first mobile terminal to be handed over from a cellular network to a WLAN sends an identity notification message to an AP in the course of accessing the WLAN through information interaction with the AP, to notify the AP that the first mobile terminal is a mobile terminal to be handed over from the cellular network to the WLAN. Correspondingly, the AP determines based upon the received identity notification message that the first mobile terminal is a mobile terminal to be handed over from the cellular network to the WLAN and then determines an updated Network Allocation Vector (NAV) value based upon a currently valid largest one of NAV values configured by other mobile terminals in the WLAN and sends an indication message carrying the updated NAV value to the other mobile terminals, so that the other mobile terminals will not try to occupy a channel in the WLAN for a length of time indicated by the updated NAV value, and thus the first mobile terminal can occupy an idle channel for communication at a priority for a predicted length of time in the length of time indicated by the updated NAV value, to improve the quality of service while the mobile terminal handed over from the cellular network to the WLAN communicates in the WLAN.

Other features and advantages of the invention will be set forth in the following description, and partially become apparent from the description or be learned upon practice of the invention. The objects and other advantages of the invention can be attained and achieved by structures particularly pointed out in the written description, the claims and the drawings.

DETAILED DESCRIPTION OF THE EMBODIMENTS

In order to provide solutions to improve a quality of service while a mobile terminal handed over from a cellular network to a WLAN communicates in the WLAN, embodiments of the invention provide a method and apparatus for determining a communication parameter and for communication in a WLAN, and preferred embodiments of the invention will be described below with reference to the drawings. It shall be appreciated that the preferred embodiments described here are merely intended to illustrate and explain the invention but not to limit the invention. The embodiments of the invention and features in the embodiments can be combined with each other unless there is confliction.

Figure 1:
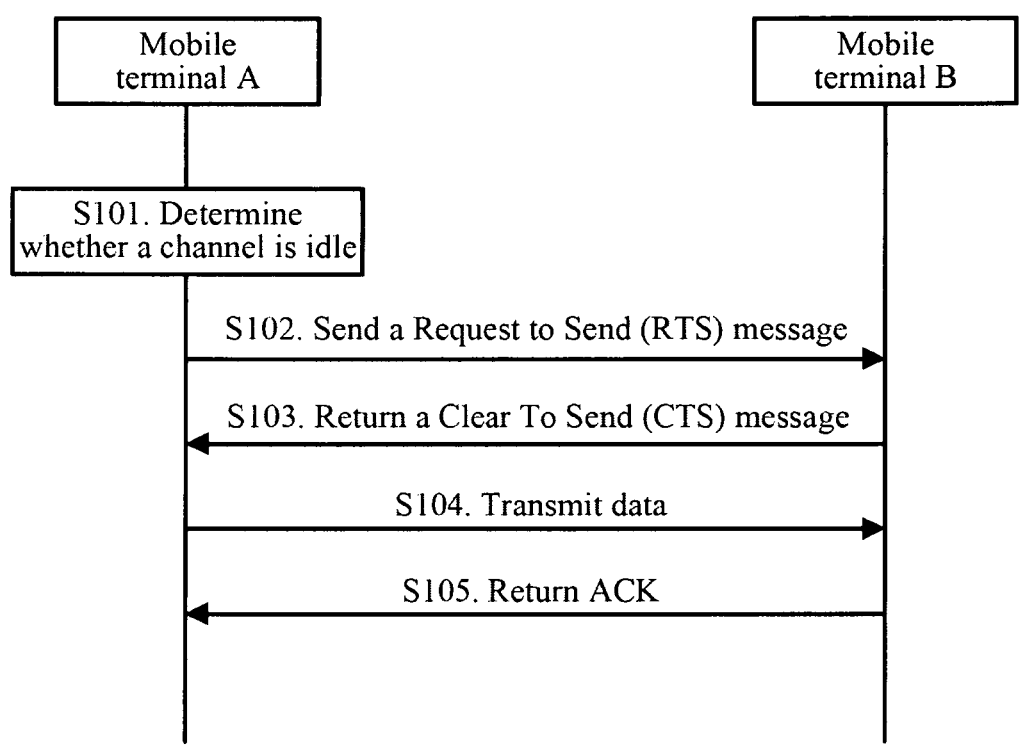
FIG. 1 is a flow chart of communication by a mobile terminal in a WLAN in the prior art.

In order to facilitate understanding of the solutions according to the embodiments of the invention, in the following description, firstly a flow for a mobile terminal to communicate in a Carrier Sense Multiple Access network with Collision Avoidance (CSMA/CA) scheme in a WLAN in the prior art is described, and as illustrated in FIG. 1, the flow includes the following steps:

Step 101. A mobile terminal A determines whether a channel is idle through carrier sense before transmitting data to a target mobile terminal B.

Figure 2:
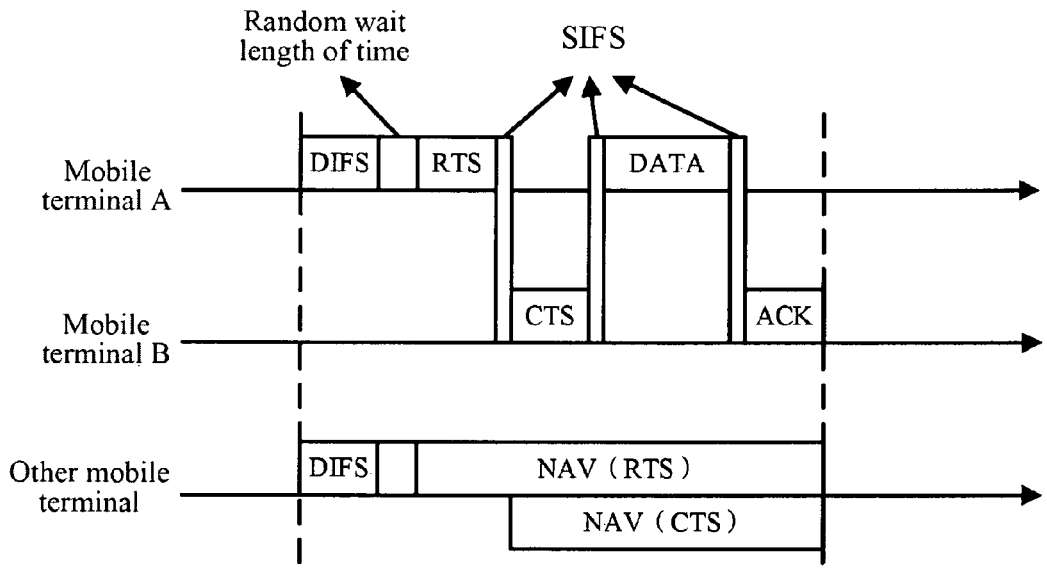
FIG. 2 is a schematic diagram of communication by a mobile terminal in a WLAN in the prior art.

Step 102. The mobile terminal A starts to communicate by firstly sending a Request to Send (RTS) message to the mobile terminal B after a wait length of time elapses after determining that the channel is idle, as illustrated in FIG. 2.

The wait length of time includes a Distributed Inter Frame Space (DIPS) and a random wait length of time, and since the random wait length of time is generated randomly in a preset random algorithm, generally a different random wait length of time is used by a different mobile terminal, to alleviate confliction of a channel occupied by different mobile terminals in communication.

Step 103. The mobile terminal B returns a Clear To Send (CTS) message to the mobile terminal A after a length of time indicated by a Short Inter Frame Space (SIFS) elapses after receiving the RTS message sent by the mobile terminal A.

Step 104. The mobile terminal A transmits data to the mobile terminal B after the length of time indicated by the SIFS elapses after receiving the CTS message returned by the mobile terminal B.

Step 105. The mobile terminal B returns an Acknowledgement (ACK) to the mobile terminal A after the length of time indicated by the SIFS after receiving the data which needs to be sent by the mobile terminal A.

So far the current data communication between the mobile terminal A and the mobile terminal B ends and the channel is changed from the occupied status to the idle status.

In the data communication process as illustrated in FIG. 1, the mobile terminal A carries a Network Allocation Vector (NAV) value, configured by the mobile terminal A, in the RTS message to indicate that the channel will be occupied in a next length of time indicated by the NAV value, and the mobile terminal B carries an NAV value, configured by the mobile terminal B, in the CTS message to indicate that the channel will be occupied in a next length of time indicated by the NAV value. As illustrated in FIG. 2, the RTS message and the CTS message may also be received by other mobile terminals in the WLAN, which thus can determine from the NAV values carried therein the length of time in which the channel will be occupied and will not try to occupy the channel for data transmission.

Figure 3:
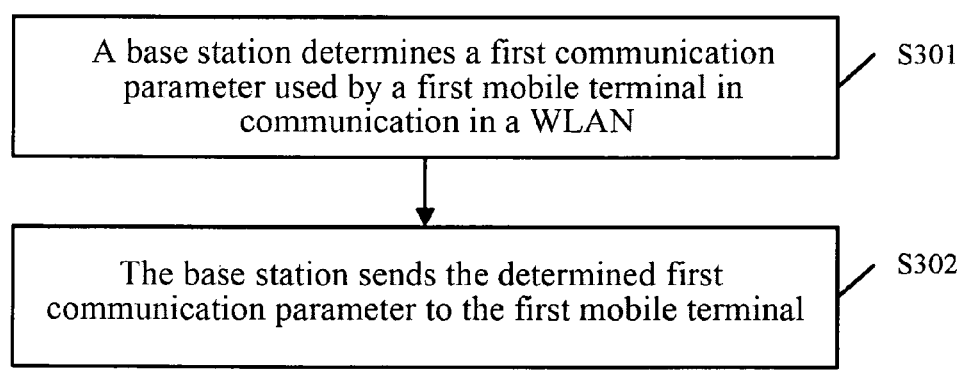
FIG. 3 is a first flow chart of a method for determining a communication parameter used by a mobile terminal according to an embodiment of the invention.

An embodiment of the invention provides a method for determining a communication parameter used by a mobile terminal, and as illustrated in FIG. 3, the method includes the following steps:

Step S301. A base station determines a first communication parameter used by a first mobile terminal in communication in a WLAN, where the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN.

Step S302. The base station sends the determined first communication parameter to the first mobile terminal.

Figure 4:
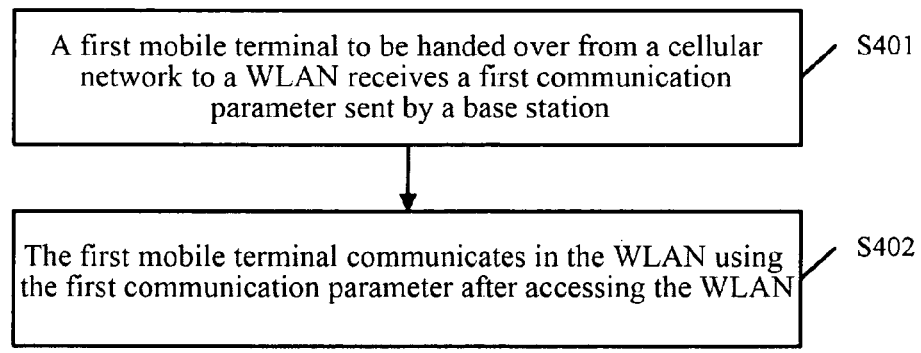
FIG. 4 is a first flow chart of a method for communication by a mobile terminal in a WLAN according to an embodiment of the invention.

Correspondingly, an embodiment of the invention further provides a method for communication by a mobile terminal in a WLAN, and as illustrated in FIG. 4, the method includes the following steps:

Step S401. A first mobile terminal to be handed over from a cellular network to a WLAN receives a first communication parameter sent by a base station.

Step S402. The first mobile terminal communicates in the WLAN using the first communication parameter after accessing the WLAN.

The method according to the embodiment of the invention will be described below in detail by way of a first embodiment with reference to the drawings.

First Embodiment

Figure 5:
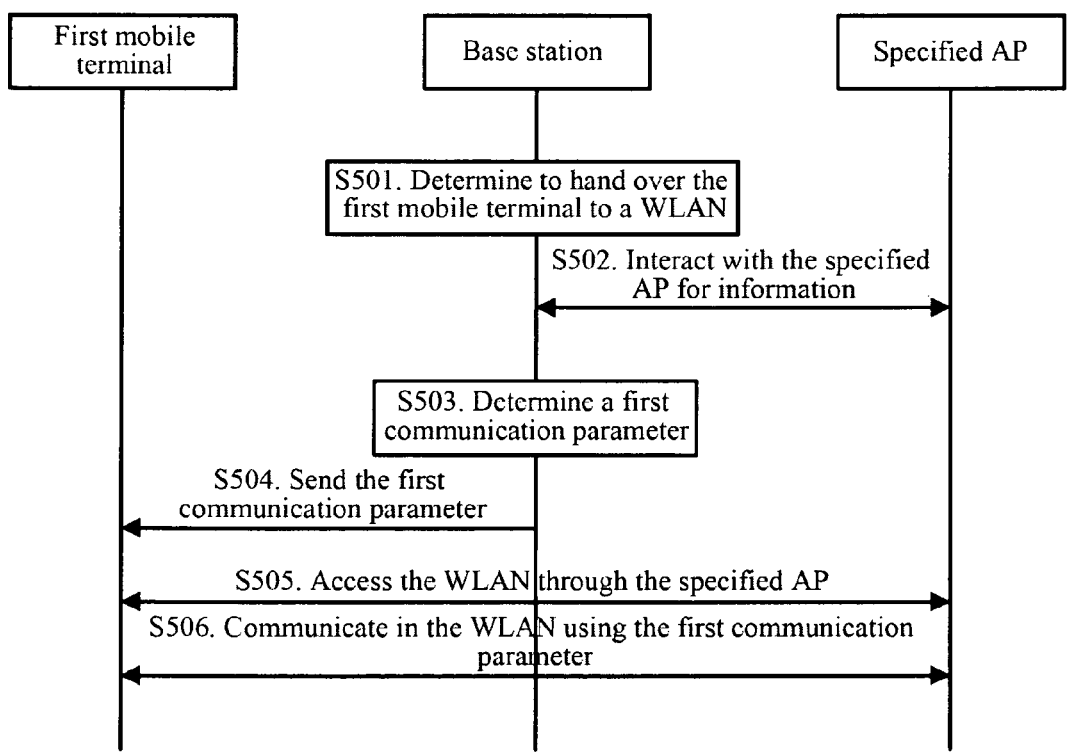
FIG. 5 is a flow chart of a mobile terminal being handed over from a cellular network to a WLAN and communicating according to a first embodiment of the invention.

FIG. 5 is a flow chart of a mobile terminal being handed over from a cellular network to a WLAN and communicating according to the first embodiment of the invention, which includes the following steps.

Step S501. A mobile terminal initiates a service in a cellular network, and a base station serving the mobile terminal determines to hand over the mobile terminal to a WLAN, which provides the mobile terminal with the service initiated by the mobile terminal. The base station may determine to hand over the mobile terminal to the WLAN based upon the type of the service initiated by the mobile terminal, for example, the base station may hand over the mobile terminal, which initiates some specified type of service, to the WLAN; or the base station may determine to hand over the mobile terminal to the WLAN based upon a network quality condition of the base station, for example, the base station may determine to hand over the mobile terminal to the WLAN when the base station currently is heavily loaded.

In order for a convenient description and to facilitate distinguishing, hereinafter a mobile terminal to be handed over from a cellular network to a WLAN is referred to as a first mobile terminal, and a mobile terminal in the WLAN, which is not handed over from the cellular network to the WLAN, is referred to as a second mobile terminal, for example, a mobile terminal accessing the WLAN directly.

Step S502. The base station interacts with an AP in the WLAN for information and may particularly interact with a specified AP near to the first mobile terminal for information.

A second communication parameter determined by the specified AP in the WLAN and used by a second mobile terminal in communication in the WLAN through the specified AP can be obtained through information interaction with the specified AP, where the second communication parameter indicates a second wait length of time of the second mobile terminal in the WLAN between determination of an idle channel and communication, and the second wait length of time may include a DIFS and/or a random wait length of time, so the second communication parameter includes a parameter for determination of the DIFS used by the second mobile terminal and/or a parameter for determination of the random wait length of time used by the second mobile terminal.

The current network quality condition of the specified AP in the WLAN, e.g., a load condition, an average delay of a data packet, a congestion condition, etc., can be further obtained through information interaction with the specified AP.

Step S503. The base station determines a first communication parameter used by the first mobile terminal in communication in the WLAN, where the first communication parameter indicates a first wait length of time of the first mobile terminal in the WLAN between determination of an idle channel and communication, and the first wait length of time may include a DIFS and/or a random wait length of time, so the first communication parameter includes a parameter for determination of the DIFS used by the first mobile terminal and/or a parameter for determination of the random wait length of time used by the first mobile terminal.

In this step, the first communication parameter may be determined particularly in the following schemes:

In a first scheme, the base station does not need to communication with the specified AP in the step S502 before determining the first communication parameter, and particularly the following two scenarios may be involved:

In a first scenario, when the second wait length of time used by the second mobile terminal in the WLAN is kept unchanged after being preset, for example, the DIFS is a fixed value, the random wait length of time is determined in a fixed random algorithm, and the range of values of the random wait length of time is also fixed, then the base station can know the second wait length of time in advance and thus can determine the first communication parameter based upon the second wait length of time, where the first wait length of time indicated by the first communication parameter is shorter than the second wait length of time, for example, the first communication parameter includes the value of the DIFS in the first wait length of time, and/or a parameter for determining a random wait length of time, where the range of values of the random wait length of time determined by using the parameter is shorter than the range of values of the random wait length of time in the second wait length of time. Since the second wait length of time in this step is kept unchanged after being preset, the first communication parameter can be determined in this scheme without requiring the base station to communicate with the specified AP in the step S502.

In a second scenario, the second wait length of time used by the second mobile terminal in the WLAN is determined by the AP according to the network condition or the type of the service initiated by the terminal, and the second mobile terminal is notified of the determined parameter indicating the second wait length of time, and in this case the base station can know the second wait length of time in advance and thus can determine the first communication parameter based upon the second wait length of time, where the first wait length of time indicated by the first communication parameter is shorter than the second wait length of time, and the first communication parameter may be a parameter for determining the first wait length of time based upon the second wait length of time, for example, the first communication parameter is the difference of the second wait length of time minus the first wait length of time, so that the first mobile terminal can know the difference from the base station and determine the first wait length of time for use based upon the second wait length of time known from the specified AP.

In a second scheme, the second wait length of time used by the second mobile terminal in the WLAN is determined by the AP according to the network condition or the type of the service initiated by the terminal, and the second mobile terminal is notified of the determined parameter indicating the second wait length of time, and in this case the base station determines the second wait length of time indicated by the second communication parameter based upon the second communication parameter obtained from the specified AP in the step S502 and then determines the first communication parameter based upon the second wait length of time, and reference can be made to the first scenario in the first scheme for details thereof, so a repeated description thereof will be omitted here.

In a third scheme, the base station determines the first communication parameter used by the first mobile terminal based upon the current network quality condition of the specified AP obtained in the step S502, where the poorer the current network quality condition is, the shorter the first wait length of time indicated by the determined first communication parameter is; and In the third scheme, preferably, the first mobile terminal is disabled from accessing the WLAN through the specified AP when the current network quality condition of the specified AP obtained in the step S502 is poorer than a preset network quality condition.

In a fourth scheme, the base station determines a quality requirement for the service currently requested by the first mobile terminal and determines the first communication parameter used by the first mobile terminal based upon the determined quality requirement, where the higher the quality requirement is, the shorter the first wait length of time indicated by the first communication parameter is.

Preferably, in this first embodiment, the first communication parameter may be determined in any combination of the four determination schemes described above, and a repeated description thereof will be omitted here.

Step S504. The base station sends the determined first communication parameter to the first mobile terminal after determining the first communication parameter and may particularly send the first communication parameter, corresponding to the specified AP in the WLAN, to the first mobile terminal.

Step S505. The first mobile terminal is handed over from the cellular network to the WLAN after receiving the first communication parameter sent by the base station and may particularly access the WLAN through the specified AP, and a particular access scheme may be any of numerous schemes in the prior art, so a repeated description thereof will be omitted here.

Step S506. The first mobile terminal communicates in the WLAN using the first communication parameter after accessing the WLAN, that is, the first mobile terminal communicates in the WLAN using the first wait length of time indicated by the first communication parameter. Reference can be made to the flows illustrated in FIG. 1 and FIG. 2 above for use of the first wait length of time in communication in the WLAN, so a repeated description thereof will be omitted here.

Particularly communication can be performed in the WLAN using the first communication parameter through the specified AP subsequent to an access to the WLAN through the specified AP.

With the solution according to the first embodiment described above, since the first wait length of time, used by the first mobile terminal in the WLAN, indicated by the first communication parameter is shorter than the second wait length of time used by the second mobile terminal in the WLAN, the first mobile terminal can occupy the idle channel for communication at a priority higher than the second mobile terminal, to improve the quality of service while the mobile terminal handed over from the cellular network to the WLAN communicates in the WLAN.

As can be apparent from the foregoing description of the solution illustrated in FIG. 5, when the first wait length of time includes the DIFS and the random wait length of time, the random wait length of time is determined in the random algorithm, and the range of values of the random wait length of time determined by using the parameter, in the first communication parameter, for determining the random wait length of time is shorter than the range of values of the random wait length of time in the second wait length of time, but there may still some probability that the random wait length of time in the first wait length of time is not shorter than the random wait length of time in the second wait length of time in determination of the random wait length of times, so that the first wait length of time may not shorter than the second wait length of time. However, generally, since the DIFS in the first wait length of time is shorter than the DIFS in the second wait length of time, and the range of values of the random wait length of time in the first wait length of time is shorter than the range of values of the random wait length of time in the second wait length of time, so there is a higher probability that the first wait length of time is shorter than the second wait length of time, and thus it will still be possible to improve the quality of service while the mobile terminal handed over from the cellular network to the WLAN communicates in the WLAN.

Moreover, it is impossible that the first wait length of time is not shorter than the second wait length of time when the first communication parameter is the difference of the second wait length of time minus the first wait length of time.

Figure 6:
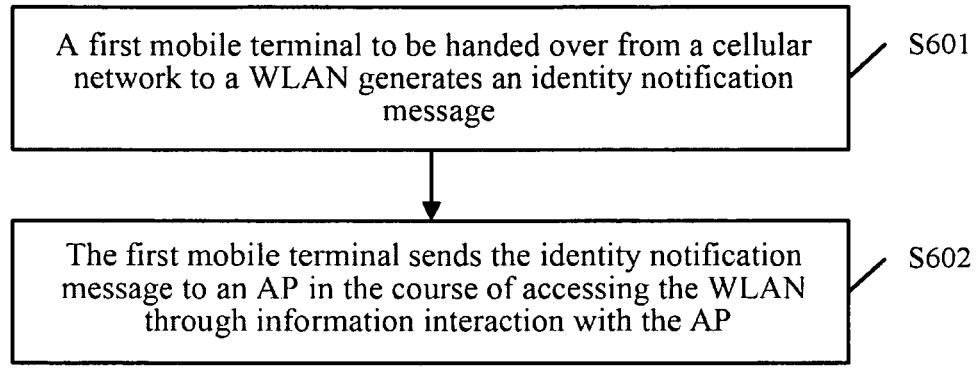
FIG. 6 is a flow chart of a method for accessing by a mobile terminal a WLAN according to an embodiment of the invention.

An embodiment of the invention further provides a method for accessing by a mobile terminal a WLAN, and as illustrated in FIG. 6, the method includes the following steps:

Step S601. A first mobile terminal to be handed over from a cellular network to a WLAN generates an identity notification message.

Step S602. The first mobile terminal sends the identity notification message to an AP in the course of accessing the WLAN through information interaction with the AP, where the identity notification message is used to notify the AP that the first mobile terminal is a mobile terminal to be handed over from the cellular network to the WLAN.

Figure 7:
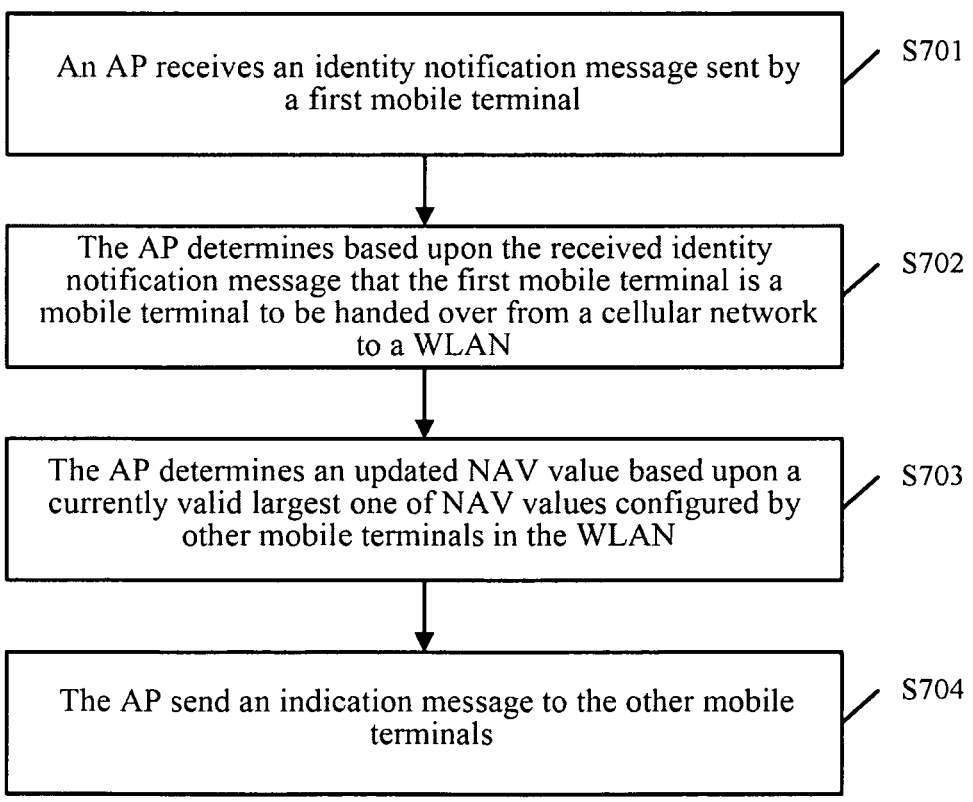
FIG. 7 is a second flow chart of a method for determining a communication parameter used by a mobile terminal according to an embodiment of the invention.

Correspondingly, an embodiment of the invention further provides a method for determining a communication parameter used by a mobile terminal, and as illustrated in FIG. 7, the method includes the following steps:

Step S701. An AP receives an identity notification message sent by a first mobile terminal.

Step S702. The AP determines based upon the received identity notification message that the first mobile terminal is a mobile terminal to be handed over from a cellular network to a WLAN.

Step S703. The AP determines an updated NAV value based upon a currently valid largest one of NAV values configured by other mobile terminals in the WLAN, where the updated NAV value is the sum of a remaining length of time and a predicted length of time, and the remaining length of time is a remaining length of time, of the largest NAV value, from the current moment, and the predicted length of time is a length of time predicted to be required for the current communication by the first mobile terminal.

Step S704. The AP sends an indication message carrying the updated NAV value to the other mobile terminals.

The method according to the embodiment of the invention will be described below in detail by way of a second embodiment with reference to the drawings.

Second Embodiment

Figure 8:
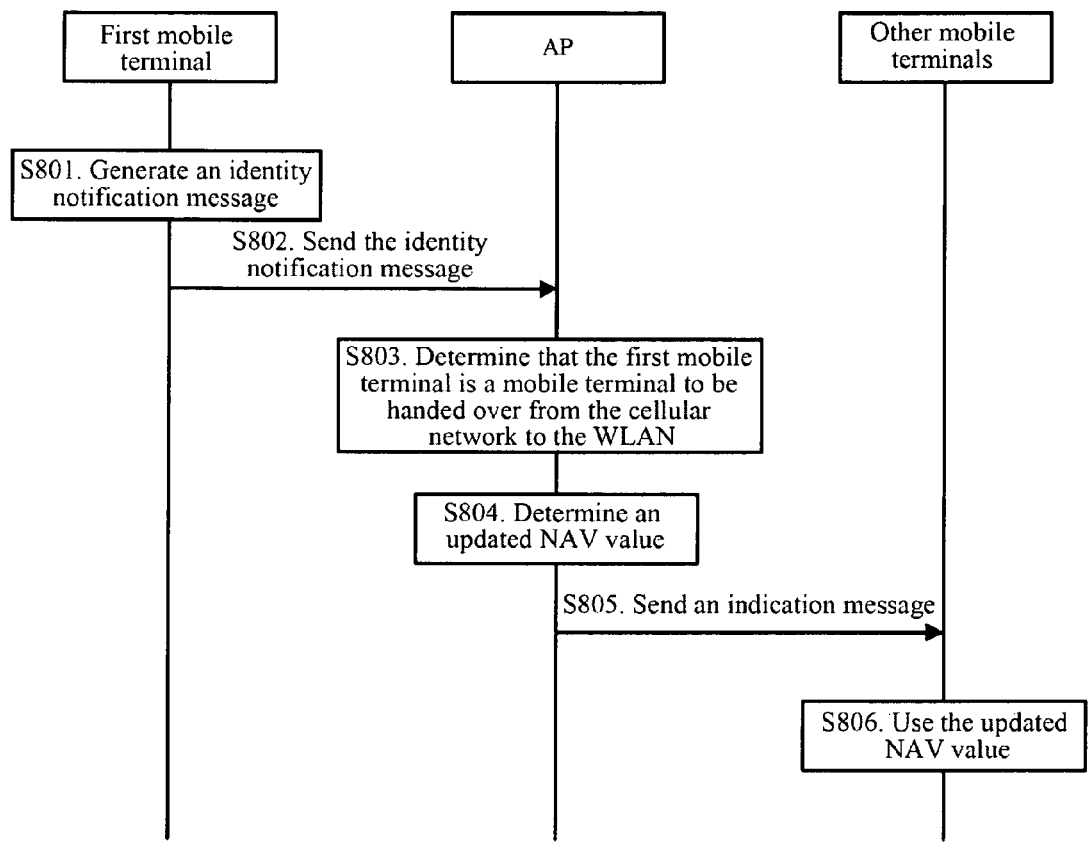
FIG. 8 is a flow chart of a mobile terminal being handed over from a cellular network to a WLAN and communicating according to a second embodiment of the invention.

FIG. 8 is a flow chart of a mobile terminal being handed over from a cellular network to a WLAN and communicating according to the second embodiment of the invention, which includes the following steps:

Step S801. A first mobile terminal to be handed over from a cellular network to a WLAN generates an identity notification message carrying information indicating that the first mobile terminal is a mobile terminal to be handed over from the cellular network to the WLAN.

For example, 1-bit information may be added into an existing Probe Request frame sent by a mobile terminal when accessing an AP, or 1-bit information may be added into an Association Request frame, and the Probe Request frame or the Association Request frame with the 1-bit information added may be used as the identity notification message, where the added 1-bit information is the information indicating that the first mobile terminal is a mobile terminal to be handed over from the cellular network to the WLAN.

Step S802. The first mobile terminal sends the identity notification message to an AP in the course of accessing the WLAN through information interaction with the AP, where the identity notification message is used to notify the AP that the first mobile terminal is a mobile terminal to be handed over from the cellular network to the WLAN.

Step S803. After receiving the identity notification message sent by the first mobile terminal, the AP determines based upon the received identity notification message that the first mobile terminal is a mobile terminal to be handed over from the cellular network to the WLAN.

Step S804. The AP determines an updated NAV value based upon a currently valid largest one of NAV values configured by other mobile terminals in the WLAN, where the updated NAV value is the sum of a remaining length of time and a predicted length of time, and the remaining length of time is a remaining length of time, of a length of time indicated by the largest NAV value, from the current moment, and the predicted length of time is a length of time predicted to be required for the current communication by the first mobile terminal.

This step may be performed particularly as follows:

The AP receives RTS messages and CTS messages sent by the other mobile terminals and obtains carried NAV values from the RTS messages and the CTS messages, where the obtained NAV values are NAV values configured by the other mobile terminals; and after obtaining an NAV value, the AP maintains a validity status of the NAV value based upon a moment when the NAV value is received and a length of time indicated by the NAV value, where the NAV value is valid for the length of time indicated by the NAV value from the moment when the NAV value is received, and the NAV value is invalid after the length of time indicated by the NAV value from the moment when the NAV value is received; and the AP determines a currently valid largest NAV value by maintaining the validity statuses of the NAV values configured by the other mobile terminals;

With reference to the current moment, the AP determines a remaining length of time, of the length of time indicated by the largest NAV value, from the current moment, that is, the length of time indicated by the NAV value minus a length of time from the moment when the NAV value is received to the current moment;

The AP predicts a length of time required for the current communication by the first mobile terminal, which is referred to as the predicted length of time, possibly particularly as follows: the AP determines the predicted length of time corresponding to the type of the current service, reported by the first mobile terminal, based upon the type of the service; or determines the predicted length of time based upon the amount of data to be transmitted of the current service, reported by the first mobile terminal; or determines the predicted length of time is a preset default predicted length of time, where the first mobile terminal may report the type of the current service or the amount of data to be transmitted of the current service to the AP in the course of accessing the WLAN; and the default predicted length of time may be determined according to a real network condition and real characteristics of current various types of services;

The AP determines the updated NAV value is the sum of the remaining length of time and the predicted length of time.

Step S805. The AP sends an indication message carrying the updated NAV value to the other mobile terminals.

The indication message may be sent to the other mobile terminals based upon a scheme to transmit an RTS message and a CTS message in the prior art, and the format of the indication message may be the same as the format of the RTS message or the CTS message, and the update NAV value may be carried in a field, for carrying an NAV value, in the RTS message and the CTS message, so that the indication message can be received and recognized by the other mobile terminals without any modification to the other mobile terminals. In this case, since the indication message can also be received by the first mobile terminal, in order to avoid the first mobile terminal from communication using the updated NAV value carried in the indication message upon reception of the indication message, invalid flag information, for example, identification information of the first mobile terminal, may be carried in the indication message, so that the first mobile terminal may determine that the updated NAV value carried in the indication message is invalid thereto after recognizing the invalid flag information corresponding thereto from the indication message.

Step S806. After receiving the indication message, the other mobile terminals obtain the carried updated NAV value therefrom and control their communication processes in the WLAN based upon the length of time indicated by the updated NAV value, and reference can be made to the flows illustrated in FIG. 1 and FIG. 2 above for the function of the NAV value, so a repeated description thereof will be omitted here.

With the solution according to the second embodiment of the invention, the other mobile terminals will not try to occupy a channel in the WLAN for the length of time indicated by the updated NAV value, so that the first mobile terminal can occupy an idle channel for communication at a priority for the predicted length of time in the length of time indicated by the updated NAV value, to improve the quality of service while the mobile terminal handed over from the cellular network to the WLAN communicates in the WLAN.

Figure 9:
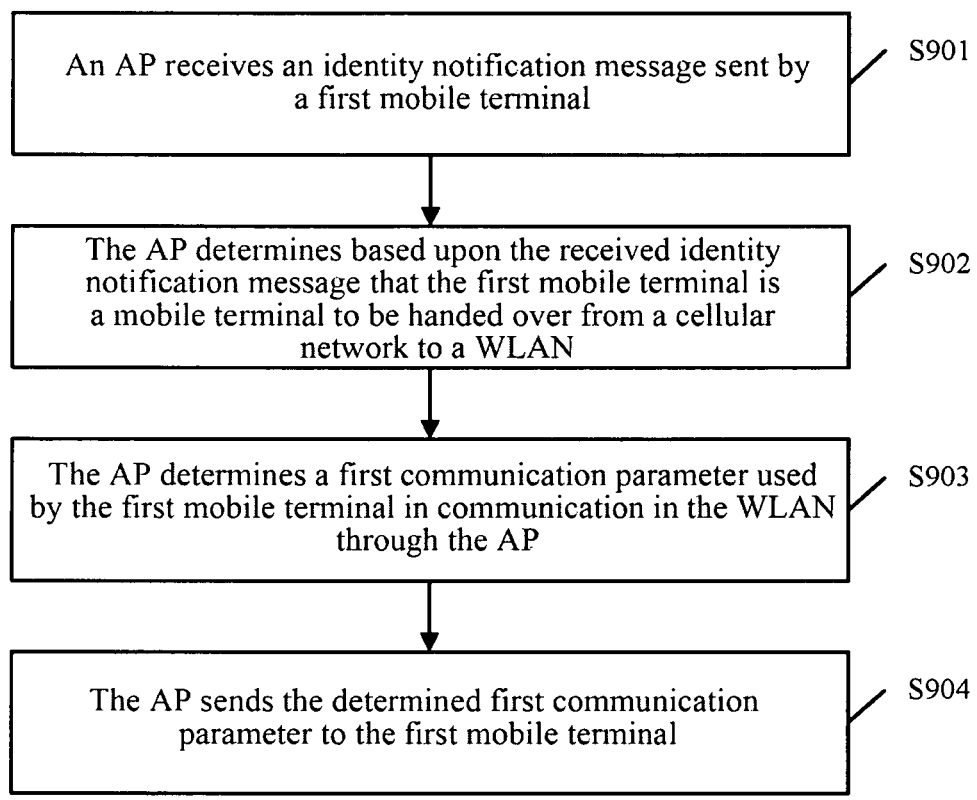
FIG. 9 is a third flow chart of a method for determining a communication parameter used by a mobile terminal according to an embodiment of the invention.

Based upon the method for accessing by a mobile terminal a WLAN as illustrated in FIG. 6 above, correspondingly, an embodiment of the invention further provides a method for determining a communication parameter used by a mobile terminal, and as illustrated in FIG. 9, the method includes the following steps:

Step S901. An AP receives an identity notification message sent by a first mobile terminal.

Step S902. The AP determines based upon the received identity notification message that the first mobile terminal is a mobile terminal to be handed over from a cellular network to a WLAN.

Step S903. The AP determines a first communication parameter used by the first mobile terminal in communication in the WLAN through the AP, where the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN.

Step S904. The AP sends the determined first communication parameter to the first mobile terminal.

The method according to the embodiment of the invention will be described below in detail by way of a third embodiment with reference to the drawings.

Third Embodiment

Figure 10:
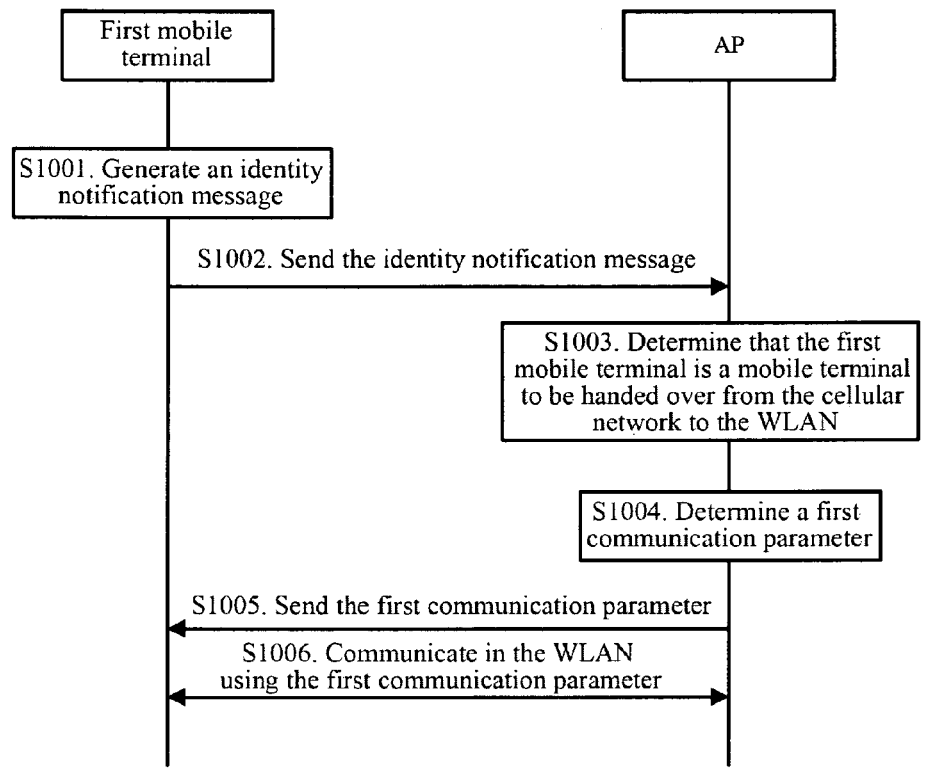
FIG. 10 is a flow chart of a mobile terminal being handed over from a cellular network to a WLAN and communicating according to a third embodiment of the invention.

FIG. 10 is a flow chart of a mobile terminal being handed over from a cellular network to a WLAN and communicating according to the third embodiment of the invention, which includes the following steps:

Step S1001. A first mobile terminal to be handed over from a cellular network to a WLAN generates an identity notification message carrying information indicating that the first mobile terminal is a mobile terminal to be handed over from the cellular network to the WLAN.

For example, 1-bit information may be added into an existing Probe Request frame sent by a mobile terminal accessing an AP, or 1-bit information may be added into an Association Request frame, and the Probe Request frame or the Association Request frame with the 1-bit information added may be used as the identity notification message, where the added 1-bit information is the information indicating that the first mobile terminal is a mobile terminal to be handed over from the cellular network to the WLAN.

Step S1002. The first mobile terminal sends the identity notification message to an AP in the course of accessing the WLAN through information interaction with the AP, where the identity notification message is used to notify the AP that the first mobile terminal is a mobile terminal to be handed over from the cellular network to the WLAN.

Step S1003. After receiving the identity notification message sent by the first mobile terminal, the AP determines based upon the received identity notification message that the first mobile terminal is a mobile terminal to be handed over from the cellular network to the WLAN.

Step S1004. The AP determines a first communication parameter used by the first mobile terminal in communication in the WLAN through the AP, where the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN.

In this step, the first communication parameter may be determined in a scheme in the step S503 in FIG. 5 above, except that it is determined by the base station in the step S503 and determined by the AP in this step, so a repeated description of a particular process will be omitted here.

Step S1005. The AP sends the determined first communication parameter to the first mobile terminal after determining the first communication parameter.

Step S1006. The first mobile terminal communicates in the WLAN using the first communication parameter sent by the AP, that is, the first mobile terminal communicates in the WLAN using the first wait length of time indicated by the first communication parameter, after receiving the first communication parameter. Reference can be made to the flows illustrated in FIG. 1 and FIG. 2 above for use of the first wait length of time in the course of communication in the WLAN, so a repeated description thereof will be omitted here.

With the solution according to the third embodiment described above, since the first wait length of time, used by the first mobile terminal in the WLAN, indicated by the first communication parameter is shorter than the second wait length of time used by the second mobile terminal in the WLAN, the first mobile terminal can occupy an idle channel for communication at a priority higher than the second mobile terminal, to improve the quality of service while the mobile terminal handed over from the cellular network to the WLAN communicates in the WLAN.

Fourth Embodiment

Figure 11:
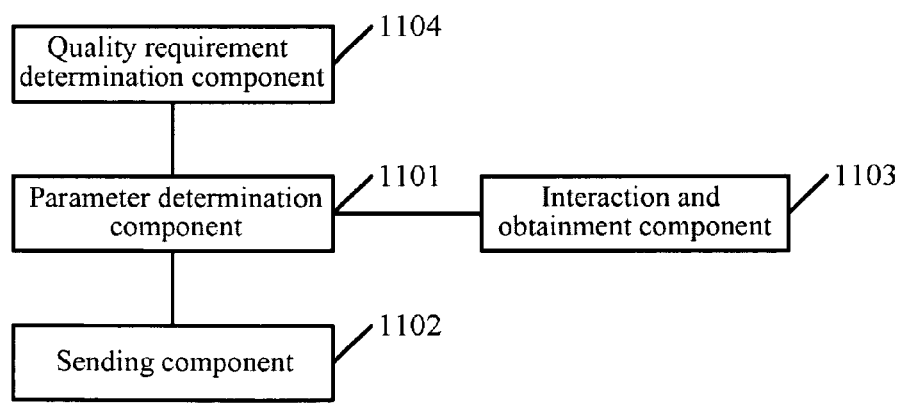
FIG. 11 is a schematic structural diagram of a base station according to a fourth embodiment of the invention.

Based upon the same inventive idea, following the method for determining a communication parameter used by a mobile terminal according to the embodiment of the invention above, correspondingly, the fourth embodiment of the invention further provides a base station, and FIG. 11 illustrates a schematic structural diagram of the base station including:

a parameter determination component 1101 configured to determine a first communication parameter used by a first mobile terminal in communication in a WLAN, where the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a sending component 1102 configured to send the determined first communication parameter to the first mobile terminal.

Preferably, the base station further includes:

an interaction and obtainment component 1103 configured to obtain a second communication parameter, determined by a specified AP in the WLAN, used by the second mobile terminal in communication in the WLAN through the specified AP, through information interaction with the specified AP, before the parameter determination component 1101 determines the first communication parameter used by the first mobile terminal in communication in the WLAN, where the second communication parameter indicates the second wait length of time; and the parameter determination component 1101 is further configured to determine the first communication parameter used by the first mobile terminal in communication in the WLAN through the specified AP based upon the second wait length of time indicated by the second communication parameter.

Preferably, the base station further includes:

an interaction and obtainment component 1103 configured to obtain the current network quality condition of the specified AP in the WLAN through information interaction with the specified AP before the parameter determination component 1101 determines the first communication parameter used by the first mobile terminal in communication in the WLAN; and the parameter determination component 1101 is further configured to determine the first communication parameter used by the first mobile terminal in communication in the WLAN through the specified AP based upon the obtained current network quality condition of the specified AP, where the poorer the current network quality condition is, the shorter the first wait length of time is.

Preferably, the base station further includes:

a quality requirement determination component 1104 configured to determine a quality requirement of a service currently requested by the first mobile terminal before the parameter determination component determines the first communication parameter used by the first mobile terminal in communication in the WLAN; and the parameter determination component 1101 is further configured to determine the first communication parameter used by the first mobile terminal in communication in the WLAN based upon the determined quality requirement, where the higher the quality requirement is, the shorter the first wait length of time is.

Fifth Embodiment

Figure 12:
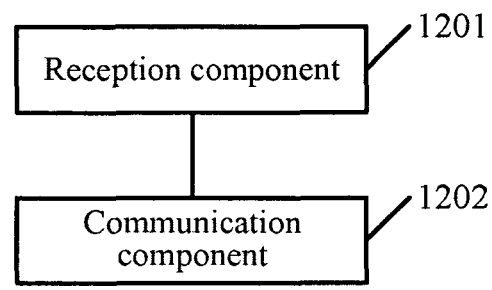
FIG. 12 is a schematic structural diagram of a mobile terminal according to a fifth embodiment of the invention.

Based upon the same inventive idea, following the method for communication by a mobile terminal in a WLAN according to the embodiment of the invention above, correspondingly, the fifth embodiment of the invention further provides a mobile terminal which is a mobile terminal to be handed over from a cellular network to a WLAN, and FIG. 12 illustrates a schematic structural diagram of the mobile terminal including:

a reception component 1201 configured to receive a first communication parameter sent by a base station, where the first communication parameter indicates a first wait length of time of the mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a communication component 1202 configured to communicate in the WLAN using the first communication parameter after accessing the WLAN.

Sixth Embodiment

Figure 13:
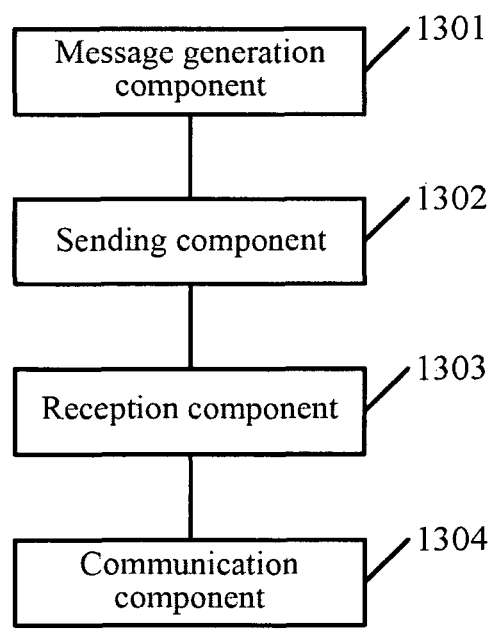
FIG. 13 is a schematic structural diagram of a mobile terminal according to a sixth embodiment of the invention.

Based upon the same inventive idea, following the method for accessing by a mobile terminal a WLAN according to the embodiment of the invention above, correspondingly, the sixth embodiment of the invention further provides a mobile terminal which is a mobile terminal to be handed over from a cellular network to a WLAN, and FIG. 13 illustrates a schematic structural diagram of the mobile terminal including:

a message generation component 1301 configured to generate an identity notification message carrying information used to notify an AP that the mobile terminal is a mobile terminal to be handed over from a cellular network to a WLAN; and a sending component 1302 configured to send the identity notification message to the AP in the course of accessing the WLAN through information interaction with the AP.

Preferably, the mobile terminal further includes:

a reception component 1303 configured to receive a first communication parameter sent by the AP, where the first communication parameter indicates a first wait length of time of the mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a communication component 1304 configured to communicate in the WLAN using the first communication parameter after accessing the WLAN.

Seventh Embodiment

Figure 14:
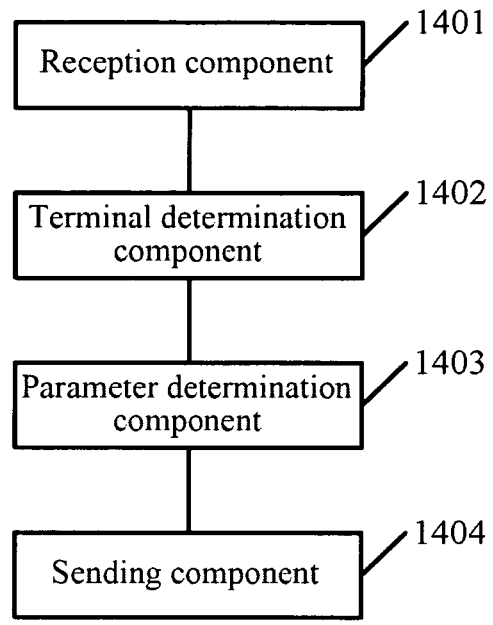
FIG. 14 is a schematic structural diagram of an access point according to a seventh embodiment of the invention.

Based upon the same inventive, following the method for determining a communication parameter used by a mobile terminal according to the embodiment of the invention above, correspondingly, the seventh embodiment of the invention further provides an AP, and FIG. 14 illustrates a schematic structural diagram of the AP including:

a reception component 1401 configured to receive an identity notification message sent by a first mobile terminal;

a terminal determination component 1402 configured to determine based upon the received identity notification message that the first mobile terminal is a mobile terminal to be handed over from a cellular network to a WLAN;

a parameter determination component 1403 configured to determine a first communication parameter used by the first mobile terminal in communication in the WLAN through the AP, where the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and a sending component 1404 configured to send the determined first communication parameter to the first mobile terminal.

Eighth Embodiment

Figure 15:
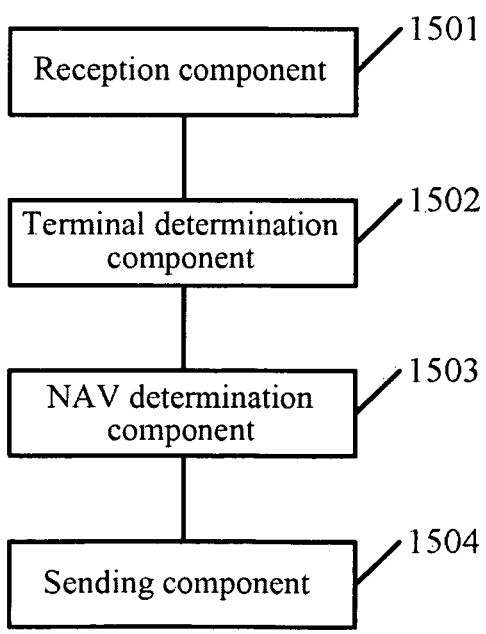
FIG. 15 is a schematic structural diagram of an access point according to an eighth embodiment of the invention.

Based upon the same inventive idea, following the method for determining a communication parameter used by a mobile terminal according to the embodiment above, correspondingly, the eighth embodiment of the invention further provides an AP, and FIG. 15 illustrates a schematic structural diagram of the AP including:

a reception component 1501 configured to receive an identity notification message sent by a first mobile terminal;

a terminal determination component 1502 configured to determine based upon the received identity notification message that the first mobile terminal is a mobile terminal to be handed over from a cellular network to a WLAN;

an NAV determination component 1503 configured to determine an updated NAV value based upon a currently valid largest one of NAV values configured by other mobile terminals in the WLAN, where the updated NAV value is the sum of a remaining length of time and a predicted length of time, and the remaining length of time is a remaining length of time, of a length of time indicated by the largest NAV value, from the current moment, and the predicted length of time is a length of time predicted to be required for the current communication by the first mobile terminal; and a sending component 1504 configured to send an indication message carrying the updated NAV value to the other mobile terminals.

Preferably, the NAV determination component 1503 is further configured to determine the predicted length of time as follows:

to determine the predicted length of time corresponding to the type of the current service, reported by the first mobile terminal, based upon the type of the service; or to determine the predicted length of time based upon the amount of data to be transmitted of the current service, reported by the first mobile terminal; or to determine the predicted length of time is a preset default predicted length of time.

In summary, in the solution according to the embodiments of the invention, a base station determines a first communication parameter used by a first mobile terminal in communication in a WLAN, where the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN which is not handed over from the cellular network to the WLAN; and the base station sends the determined first communication parameter to the first mobile terminal. Correspondingly, the first mobile terminal to be handed over from the cellular network to the WLAN receives the first communication parameter sent by the base station and communicates in the WLAN using the first communication parameter after accessing the WLAN. With the solutions according to the embodiments of the invention, a quality of service while the mobile terminal handed over from the cellular network to the WLAN communicates in the WLAN is improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for determining a communication parameter used by a mobile terminal, comprising:
    a base station determining a first communication parameter used by a first mobile terminal in communication in a Wireless Local Area Network, WLAN, wherein the first mobile terminal is a mobile terminal to be handed over from a cellular network to the WLAN, and the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and
    sending the determined first communication parameter to the first mobile terminal;
    wherein before the base station determines the first communication parameter used by the first mobile terminal in communication in the WLAN, the method further comprises:
    the base station obtaining a second communication parameter, determined by a specified Access Point, AP, in the WLAN, used by the second mobile terminal in communication in the WLAN through the specified AP, through information interaction with the specified AP, wherein the second communication parameter indicates the second wait length of time;
    and wherein the base station determining the first communication parameter used by the first mobile terminal in communication in the WLAN comprises:
    the base station determining the first communication parameter used by the first mobile terminal in communication in the WLAN through the specified AP based upon the second wait length of time indicated by the second communication parameter.

2. The method according to claim 1, wherein before the base station determines the first communication parameter used by the first mobile terminal in communication in the WLAN, the method further comprises:
    the base station obtaining the current network quality condition of a specified AP in the WLAN through information interaction with the specified AP;
    and wherein the base station determining the first communication parameter used by the first mobile terminal in communication in the WLAN further comprises:
    the base station determining the first communication parameter used by the first mobile terminal in communication in the WLAN through the specified AP based upon the obtained current network quality condition of the specified AP and the second wait length of time, wherein the poorer the current network quality condition is, the shorter the first wait length of time is.

3. The method according to claim 2, wherein after the base station obtains the current network quality condition of the specified AP, the method further comprises:
disabling the first mobile terminal from accessing the WLAN through the specified AP when the obtained current network quality condition of the specified AP is poorer than a preset network quality condition.

4. The method according to claim 3, wherein the first communication parameter comprises:
a parameter for determination of a Distributed Inter Frame Space, DIFS, used by the first mobile terminal in communication in the WLAN, and/or
a parameter for determination of a random wait length of time used by the first mobile terminal in communication in the WLAN, wherein the random wait length of time is a wait length of time of the first mobile terminal in the WLAN until communication after the DIFS elapses after determining the idle channel.

5. The method according to claim 1, wherein before the base station determines the first communication parameter used by the first mobile terminal in communication in the WLAN, the method further comprises:
the base station determining a quality requirement of a service currently requested by the first mobile terminal;
and wherein the base station determining the first communication parameter used by the first mobile terminal in communication in the WLAN further comprises:
the base station determining the first communication parameter used by the first mobile terminal in communication in the WLAN based upon the determined quality requirement and the second wait length of time, wherein the higher the quality requirement is, the shorter the first wait length of time is.

6. The method according to claim 2, wherein the first communication parameter comprises:
a parameter for determination of a Distributed Inter Frame Space, DIFS, used by the first mobile terminal in communication in the WLAN, and/or
a parameter for determination of a random wait length of time used by the first mobile terminal in communication in the WLAN, wherein the random wait length of time is a wait length of time of the first mobile terminal in the WLAN until communication after the DIFS elapses after determining the idle channel.

7. The method according to claim 5, wherein the first communication parameter comprises:
a parameter for determination of a Distributed Inter Frame Space, DIFS, used by the first mobile terminal in communication in the WLAN, and/or
a parameter for determination of a random wait length of time used by the first mobile terminal in communication in the WLAN, wherein the random wait length of time is a wait length of time of the first mobile terminal in the WLAN until communication after the DIFS elapses after determining the idle channel.

8. The method according to claim 1, wherein the first communication parameter comprises:
a parameter for determination of a Distributed Inter Frame Space, DIFS, used by the first mobile terminal in communication in the WLAN, and/or
a parameter for determination of a random wait length of time used by the first mobile terminal in communication in the WLAN, wherein the random wait length of time is a wait length of time of the first mobile terminal in the WLAN until communication after the DIFS elapses after determining the idle channel.

9. A method for determining a communication parameter used by a mobile terminal, comprising:
an Access Point, AP, receiving an identity notification message sent by a first mobile terminal;
determining based upon the received identity notification message that the first mobile terminal is a mobile terminal to be handed over from a cellular network to a Wireless Local Area Network, WLAN;
determining a first communication parameter used by the first mobile terminal in communication in the WLAN through the AP, wherein the first communication parameter indicates a first wait length of time of the first mobile terminal in the WLAN between determination of an idle channel and communication, and the first wait length of time is shorter than a second wait length of time of a second mobile terminal in the WLAN between determination of an idle channel and communication, and the second mobile terminal is a mobile terminal in the WLAN, which is not handed over from the cellular network to the WLAN; and
sending the determined first communication parameter to the first mobile terminal;
wherein before the AP determines the first communication parameter used by the first mobile terminal in communication in the WLAN, the method further comprises:
the AP determining a second communication parameter used by the second mobile terminal in communication in the WLAN through the AP, wherein the second communication parameter indicates the second wait length of time;
and wherein the AP determining the first communication parameter used by the first mobile terminal in communication in the WLAN comprises:
the AP determining the first communication parameter used by the first mobile terminal in communication in the WLAN through the AP based upon the second wait length of time indicated by the second communication parameter.

10. The method according to claim 9, wherein before the AP determines the first communication parameter used by the first mobile terminal in communication in the WLAN, the method further comprises:
the AP obtaining the current network quality condition of the AP in the WLAN;
and wherein the AP determining the first communication parameter used by the first mobile terminal in communication in the WLAN further comprises:
the AP determining the first communication parameter used by the first mobile terminal in communication in the WLAN through the AP based upon the obtained current network quality condition of the AP and the second wait length of time, wherein the poorer the current network quality condition is, the shorter the first wait length of time is.

11. The method according to claim 10, wherein after the AP obtains the current network quality condition of the AP, the method further comprises:
disabling the first mobile terminal from accessing the WLAN through the AP when the obtained current network quality condition of the AP is poorer than a preset network quality condition.

12. The method according to claim 11, wherein the first communication parameter comprises:

a parameter for determination of a Distributed Inter Frame Space, DIFS, used by the first mobile terminal in communication in the WLAN, and/or a parameter for determination of a random wait length of time used by the first mobile terminal in communication in the WLAN, wherein the random wait length of time is a wait length of time of the first mobile terminal in the WLAN until communication after the DIFS elapses after determining the idle channel.

13. The method according to claim 10, wherein the first communication parameter comprises:

a parameter for determination of a Distributed Inter Frame Space, DIFS, used by the first mobile terminal in communication in the WLAN, and/or a parameter for determination of a random wait length of time used by the first mobile terminal in communication in the WLAN, wherein the random wait length of time is a wait length of time of the first mobile terminal in the WLAN until communication after the DIFS elapses after determining the idle channel.

14. The method according to claim 9, wherein before the AP determines the first communication parameter used by the first mobile terminal in communication in the WLAN, the method further comprises:

the AP determining a quality requirement of a service currently requested by the first mobile terminal;

and wherein the AP determining the first communication parameter used by the first mobile terminal in communication in the WLAN further comprises:

the AP determining the first communication parameter used by the first mobile terminal in communication in the WLAN based upon the determined quality requirement and the second wait length of time, wherein the higher the quality requirement is, the shorter the first wait length of time is.

15. The method according to claim 14, wherein the first communication parameter comprises:

a parameter for determination of a Distributed Inter Frame Space, DIFS, used by the first mobile terminal in communication in the WLAN, and/or a parameter for determination of a random wait length of time used by the first mobile terminal in communication in the WLAN, wherein the random wait length of time is a wait length of time of the first mobile terminal in the WLAN until communication after the DIFS elapses after determining the idle channel.

16. The method according to claim 9, wherein the first communication parameter comprises:

a parameter for determination of a Distributed Inter Frame Space, DIFS, used by the first mobile terminal in communication in the WLAN, and/or a parameter for determination of a random wait length of time used by the first mobile terminal in communication in the WLAN, wherein the random wait length of time is a wait length of time of the first mobile terminal in the WLAN until communication after the DIFS elapses after determining the idle channel.

17. A method for determining a communication parameter used by a mobile terminal, comprising:

an Access Point, AP, receiving an identity notification message sent by a first mobile terminal;

determining based upon the received identity notification message that the first mobile terminal is a mobile terminal to be handed over from a cellular network to a Wireless Local Area Network, WLAN;

determining an updated NAV value based upon a currently valid largest one of NAV values configured by other mobile terminals in the WLAN, wherein the updated NAV value is the sum of a remaining length of time and an predicted length of time, and the remaining length of time is a remaining length of time, of a length of time indicated by the largest NAV value, from the current moment, and the predicted length of time is a length of time predicted to be required for the current communication by the first mobile terminal; and sending an indication message carrying the updated NAV value to the other mobile terminals.

18. The method according to claim 17, wherein the predicted length of time is determined by:

determining the predicted length of time corresponding to the type of the current service, reported by the first mobile terminal, based upon the type of the service; or determining the predicted length of time based upon the amount of data to be transmitted of the current service, reported by the first mobile terminal; or determining the predicted length of time is a preset default predicted length of time.

\* \* \* \* \*